United States Patent Office 3,432,468
Patented Mar. 11, 1969

3,432,468
HEAT-RESISTANT POLYTHIOETHERS AND METHOD FOR THEIR PRODUCTION
Rudolf Gabler, Zollikerberg, Switzerland, assignor to Inventa A.G. fur Forschung und Patentverwertung, Zurich, Switzerland
No Drawing. Filed Mar. 27, 1967, Ser. No. 625,986
Claims priority, application Switzerland, Mar. 28, 1966, 4,421/66
U.S. Cl. 260—47
Int. Cl. C08g 23/00, 33/00
4 Claims

ABSTRACT OF THE DISCLOSURE

Heat-resistant, linear, thermoplastic polythioethers having the generic formula

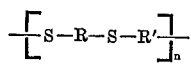

wherein R is a radical of a bivalent, binuclear aromatic thiol and R' is an aromatic radical having a strongly negative substituent in at least one of the ortho- or para-positions. These compounds are produced by condensation of the alkali- or alkaline earth metal salt of an aromatic dithiol with a bivalent aromatic halogen compound.

---

Numerous experiments indicate that polythioethers having the structure (1)

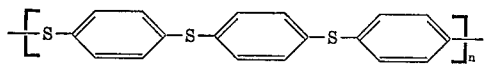 (1)

are of extreme thermal stability (see, for instance, A. D. Macallum, J. Org. Chem 13, 154; R. W. Lenz, J. Polymer Sci. 58, 351; C. C. Price, ibid. 1964, 1511; H. A. Smith, Rubber Plastics Age 44, 1048.) Polymers of this kind will tolerate heating at 400–500° C. for prolonged periods of time without change in their chemical composition. Due to the difficulty that high molecular weights cannot be attained and due to undesirable side reactions, such as branching and cross-linking, these polymers have not had any technological significance to date.

Certain oxygen homologs of these compounds are produced on a comercial scale, such as polyphenylethers. However, their heat resistance does not approach that of polythioethers.

A similar class of polymers, the so-called "polysulfones" also have an unbranched chain of aromatic rings which are linked by different mononuclear members. In a preferred embodiment thereof, the ether-, sulfone- and 2,2-propyl groups are used as chain linkage members.

The thermal stability of the polysulfones and polyphenylethers is more or less alike and is chacterized by short-term stability at 300–350° C. (within several hours) and by a long-term stability of 160–200° C. (within a period of several months).

It now has been found that by inserting thioether groups into a purely aromatic polymer chain, a considerable improvement of the heat resistance of the plastics thus produced can be attained. The presence of less thermostable links, aside from the thioether group, between the aromatic rings does not detract from the stability. Such links may be ether-, sulfone-, sulfoxy-, 2,2- propyl- and other groups. This is the more surprising and unexpected since there is good reason to believe that the heat stability of such a polymer chain is governed by the relative stability of its weakest link. That this is not the case, is evident from the thermogravimetric determinations listed in the table below.

The object of the invention is the production of heat-resistant linear thermoplastic polythioethers having the generic structural Formula 2

$$\text{\textonehalf S—R—S—R'\textonehalf}_n \qquad (2)$$

wherein R is a radical of a bivalent, binuclear aromatic thiol and R' is a radical of an aromatic compound having an inert electron-attractive group in at least one of the ortho- or para-positions present, and wherein both radicals are interconnected by sulfur atoms. It is characterized by the condensation of an alkali- or alkaline earth metal salt of an aromatic dithiol compound of the generic Formula 3

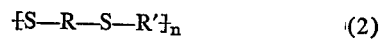 (3)

wherein A is a bivalent link, such as

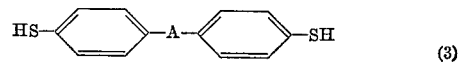

or the like, with a bivalent aromatic halogen compound of the generic Formula 4

$$\text{Hal—B—Hal} \qquad (4)$$

wherein Hal is F, Cl, Br or I, and B is an aromatic radical which has a strongly negative substituent in at least one ortho- or para-position.

By "negative substituents" such atoms or atom groups are means which exert an electron-attracting effect whose σ-constant, according to the Hammet definition, has a positive value (L. P. Hammet, Phys. Org. Chem., New York 1940, pp. 184 et seq). "Strongly negative groups" usable for the purpose at hand, are those whose σ-value preferably is ≧ 0.5.

The polythioethers according to the invention thus are produced by the condensation of binary alkali- and alkaline earth metal salts of a dithiol with an aromatic dihalogen compound whose halogen is directly on the aromatic ring and is activated by the presence of strongly negative groups, as defined above. The polycondensation may proceed, for instance, according to one of the following general reaction patterns (5, 6 or 7):

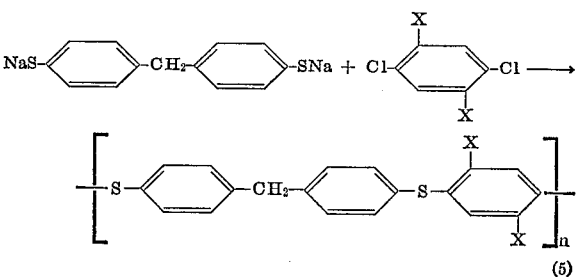

(5)

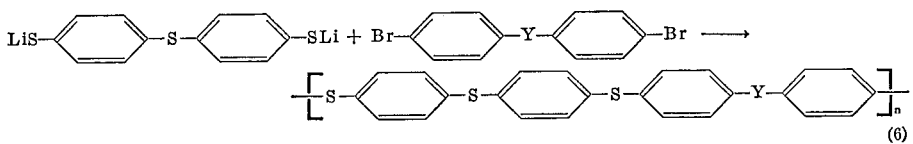

(6)

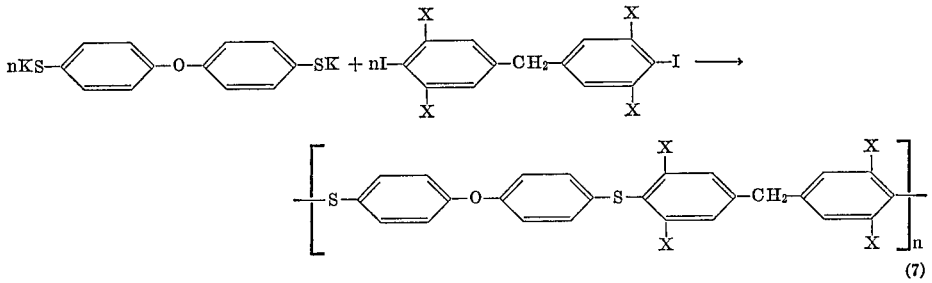

(7)

In these equations, X and Y are electron-attracting groups whereby X are monovalent groups which, in ortho-position, activate the halogen of only one ring, and Y are bivalent groups which, in para-position, activate both halogens of two rings.

Suitable electronegative groups of the monovalent type X are, for instance, the nitro-, nitroso-, acetyl-, carboxyalkyl-, cyano-, alkylsulfone-, phenylsulfone- and the trifluoromethyl groups. As bivalent electron-attracting groups, examples are the carbonyl-, sulfoxyl-, sulfone-, phenylsulfoxy- and the phosphine oxide group.

For the production of the polythioethers according to the invention, the following starting materials, among others, may be used:

A. Dithiols 4,4'-disulfhydryldiphenylmethane
4,4'-disulfhydryldiphenylether
4,4'-disulfhydryldiphenylsulfide
4,4'-disulfhydryldiphenyldisulfide
4,4'-disulfhydryldiphenylsulfoxide
4,4'-disulfhydryldiphenylsulfone
4,4'-disulfhydryldiphenyl-2,2-propane
4,4'-disulfhydrylbenzophenone.

B. Dihalogen compounds 2,5-dichloro-1,4-dinitrobenzene
2,5-dibromo-1,4-diacetylbenzene
2,5-dibromoterephthalic acid dinitrile
4,4'-dichlorodiphenylsulfone
4,4'-dichlorodiphenyltrifluoroethane
4,4'-dibromodiphenylsulfoxide
4,4'-dichlorodiphenyl-p-ethylphosphine oxide.

The polycondensation to the high-molecular polythioethers according to the invention preferably is carried out in a strongly polar solvent. Especially suitable are such solvents wherein the starting materials, i.e., the salt of the dithiol and the dihalogen compounds, as well as the end product, i.e., the high-polymer, are well soluble. Therefore, suitable solvents are dimethylformamide, dimethylacetamide, dimethylsulfoxide, hexamethylphosphoneamide, N-methylpyrrolidone, ethyleneglycoldimethylether, diethyleneglycoldimethylether, tetrahydrothiophene - 1,1-dioxide (sulfolane), and similar solvents. It has been found practical to produce the required alkali- or alkaline earth salt of the dithiol directly in the reaction solution by addition of the calculated quantity of the corresponding alkali- or alkaline earth hydroxide without prior isolation. The water formed thereby must be removed from the reaction mixture before the dihalogen compound is added thereto. This can be accomplished by distillation, by fixing it to a suitable agent such as calcined magnesium sulfate or sodium sulfate or by azeotropic distillation using an entraining agent, such as, for instance, benzene, toluene or xylene.

However, it is equally feasible to produce the binary dithiol salt in a separate step, to dissolve it in a suitable polar solvent and to react it with the dihalogen compound.

The dithiol or its salt, respectively, and the dihalogen compound preferably are reacted in equivalent proportions. In some instances it has proved meritorious to use a slight excess of one or the other component. Such an excess of one component may be required in order to attain a predetermined high molecular weight of the polymer. In other instances, it is opportune to have an excess to limit the molecular weight to a given value. In that instance, the dihalogen compound should preferably be present in an excess.

The reaction temperatures depend upon the reactivity of the dihalogen compound employed which vary from each other in this respect. Generally the temperatures are between substantially 50 and 250° C. A temperature range of 100–150° C. is preferred because some of the polar solvents named above decompose at higher temperatures thus lowering the quality of the end product.

The course of the polycondensation reaction can be observed by physical or chemical means, such as viscosity measurements or titration of the halogen split off in ionized state. In most cases, a condensation time of 3–5 hours suffices for the production of high-molecular polythioethers having the character of a plastic or synthetic resin.

It is opportune to keep the reaction mixture well agitated by a mechanical stirrer in order to assure homogeneity of the end product. It also is recommended to employ an inert gas protection in order to avoid side reactions of the dithiols which are sensitive to oxidation. All commonly used inert gases may be applied, such as nitrogen, hydrogen, argon, and others.

When the binary salts of the dithiols are the starting products, the process can be carried out continuously, for instance in such a manner that the dithiol salt is mixed with the dihalogen compound in substantially equivalent quantities, dissolved in the polar solvent and conducted through a heated tube type reactor after homogenization.

The polythioethers produced according to the invention can be isolated in several different manners. For instance, the cooled polymer solution can be poured into a suitable precipitant. This may be water, acetone or methanol wherein the polythioethers are insoluble and precipitate substantially quantitatively as a white to slightly yellowish powder.

The solvent also can be evaporated or distilled, and the polymer obtained in the form of its melt which then is directly conducted to a granulator.

Another embodiment of isolation of the polymer is to conduct the solution to a spray drier. The solution is urged through a nozzle and thereby converted into a fine spray which, in a cyclone oven, separates into solvent and finely powdered polymer. The solvent can be recovered in the customary manner.

The polythioethers according to the invention are high-melting thermoplastic resins which exhibit good mechanical properties and outstanding heat resistance, provided the molecular weight is sufficiently high.

The molecular weight best is determined by the solution viscosity because most of the polythioethers according to the invention are soluble in methylene chloride or in chloroform. It has been found that even at an intrinsic viscosity of ≧0.4 the mechanical and thermal properties of the resin are so far developed that with further increase in molecular weight only negligible improvement ensues in this respect.

The table below shows the influence of the molecular weight or the intrinsic viscosity ($\eta$), respectively, on the melting range and thermal stability of a given polythioether, in this case, the condensation product of 4,4'-disulfhydryldiphenylether and 4,4'-dichlorophenylsulfone having Formula (8)

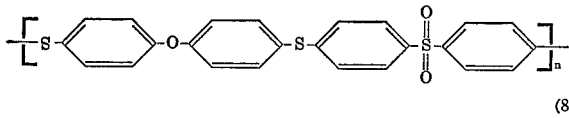

(8)

The thermostability was determined thermogravimetrically and was compared with two commercially available resins of similar structure. One of these is polyphenylene oxide (PPO) having Formula 9, and the other polysulfone having the structure as shown in Formula 10

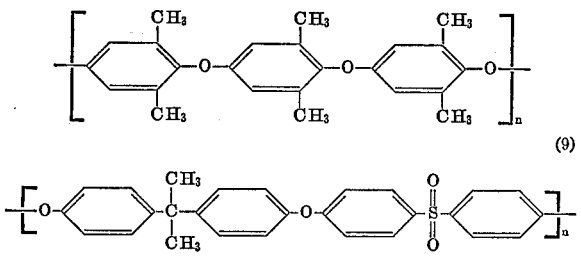

(9)

(10)

TABLE.—THERMOGRAVIMETRIC ANALYSES

[Loss in weight [1] (percent) after heating for 2 hours at 0.01 torr]

| Polymer | [$\eta$] | M.P. (° C.) | Loss in weight at ° C. | | | | |
|---|---|---|---|---|---|---|---|
| | | | 250 | 300 | 350 | 400 | 450 |
| Polythioether (8) | 0.12 | 155–170 | 0 | 0 | 2.0 | 22.2 | 74 |
| Do | 0.24 | 184–195 | 0 | 0 | 0 | 13.0 | 47.5 |
| Do | 0.43 | 210–230 | 0 | 0 | 0 | 5.8 | 34.6 |
| Do | 0.78 | 238–260 | 0 | 0 | 0 | 2.8 | 29.0 |
| PPO (9) | 0.72 | 255–290 | 0 | 0 | 8.3 | 64.0 | |
| Polysulfone (10) | 0.5 | 230–260 | 0 | 0 | 18.5 | 40.9 | |

[1] The weight losses are cumulative, i.e., the loss at 450° C. includes those at 400 and 350°.

The table shows first that the thermal stability of the polyether under investigation increases with higher molecular weight, and secondly its superiority over polyphenylene oxide and polysulfone which begin to decompose at temperatures which are approximately 50° lower than those for the polythioether.

The polythioethers according to the invention can be fabricated without difficulty in extruders and injection molding machines. Endless profiles such as rods, tubes, foils and plates of high thermal stability can thus be manufactured. Foils, coatings and impregnants can be obtained from solutions of the polythioethers in methylene chloride or chloroform.

The polymers according to the invention not only exhibit high heat resistance but also good strength characteristics, excellent chemical resistance and low water acceptance.

The invention now will be further explained by the following examples. However, it should be understood that these are given merely by way of illustration, and not of limitation, and that changes may be made in the details without departing from the spirit and the scope of the invention as hereinafter claimed.

Temperatures in the examples are degree centigrade. Percentages, unless otherwise specified, are weight percent.

EXAMPLE 1

200 ml. dimethylformamide were filled into a flask which was provided with a Dean-Stark attachment, agitator and gas inlet. The air was replaced by nitrogen, and successively 25.0 g. (1/10 mol) 4,4'-disulfhydryldiphenylsulfide, 11.2 g. (1/5 mol) KOH in 30 ml. water, and 20 ml. benzene added thereto.

The mixture was heated to the reflux temperature with strong agitation until no more water collected in the Dean-Stark attachment. The bulk of the benzene then was distilled.

After cooling to 30–40°, 34.0 g. (1/10 mol) 4,4'-dibromobenzophenone were added while conducting nitrogen through the mixture, which then was heated on an oil bath at 130–140° for 4 hours. After cooling, the yellowish grey, viscous solution was transferred to a Waring Blendor containing 500 ml. n/10 nitric acid, whereby the polymeric polythioether precipitated as a white fibrous powder. It was filtered by suction, repeatedly washed with water and vacuum-dried at 140°. 40 g. (93% of theory) of a polyether were obtained which had a melting range of 220–230° and the following structure (11)

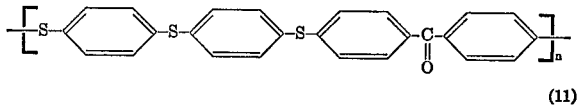

(11)

The intrinsic viscosity, determined in a 0.2 volume percent solution in N-methylpyrrolidone, was 0.48. Upon heating at 400° in a high vacuum for 2 hours, the polymer did not exhibit any loss in weight.

EXAMPLE 2

An anhydrous solution of a dithiol salt was produced in the manner as described in the preceding example from 23.4 g. (1/10 mol) 4,4'-disulfhydryldiphenylether, 11.2 g. KOH in 30 ml. water, 200 ml. dimethylsulfoxide and 20 ml. benzene.

28.7 g. (1/10 mol) 4,4'-dichlorodiphenylsulfone were added at room temperature while under inert gas protection (nitrogen) and the mixture heated for 5 hours at 130–140°.

After proceeding as in Example 1, 41 g. (92% of theory) of a polymer were recovered having the Formula 8, as shown above.

The resin had a softening range of 210–230° and had an intrinsic viscosity of 0.43 in chloroform. The thermogravimetric analysis for 2 hours in high vacuum showed a weight loss of 5.8% at 400° and of 34.6% at 450°.

The polymer powder was used to manufacture plates in a press at 280–300°. These plates had high strength characteristics.

EXAMPLE 3

12.5 g. (1/20 mol) 4,4'-disulfhydryldiphenylsulfide, 5.60 g. (1/10 mol) KOH in 15 ml. water, and 10 ml. benzene were dissolved in 200 ml. sulfolane and the water distilled azeotropically.

16.3 g. (1/20 mol) 2,5-dibromo-1,4-dinitrobenzene were added to the mixture after cooling, and this mixture heated at 130–140° for 6 hours in a hydrogen atmosphere. The cooled solution then was poured into 600 ml. water in a Waring Blendor. The precipitated yellowish polymer had the structure of Formula 12

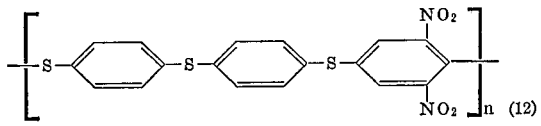

and, after washing and drying, had a melting range of 300–335°. No loss in weight was encountered upon thermogravimetric analysis for 2 hours at 400° in high vacuum.

EXAMPLE 4

17.2 g. (0.41 mol) lithium hydroxide monohydrate were dissolved in 500 ml. warm water, and 56.4 g. (0.2 mol) 4,4′-disulfhydryldiphenylsulfone added with agitation. A slight undissolved residue was filtered, and the remainder evaporated in a rotational evaporator to dryness, whereby the binary lithium salt remained quantitatively as a white powder.

29.4 g. (⅒ mol) of the dry lithium salt were suspended in 75 ml. dimethylformamide, and 28.7 g. (⅒ mol) dichlorophenylsulfone added. This was heated with agitation in a nitrogen atmosphere for 8 hours at 130–140°, and the hot contents of the flask mixed with 1 liter n/10 nitric acid in a Waring Blendor. The precipitated, slightly grey polymer had the Formula 13

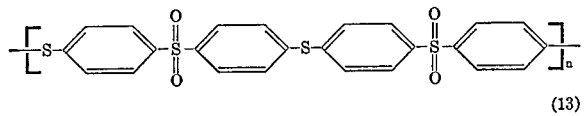

and, after repeated washing with water and drying in a high vacuum, had a melting range of 285–305°. The intrinsic viscosity of a 0.2-volume percent solution in N-methylpyrrolidone was 0.56. The polymer, upon thermogravimetric analysis for 2 hours at 400° C. in high vacuum, had a weight loss of 1.3%.

EXAMPLE 5

A 2 m. long vertical stainless steel tube having an inner diameter of 5 cm. was used for a continuous polycondensation. The tube, furnished with a jacket, was externally heated with steam of 5 atmospheres. At the lower end of the tube, which was conical in shape, a gear pump and a heated nozzle plate carrying a 3 mm. nozzle, were disposed.

Another gear pump was installed at the upper end of the condensation tube. The suction side of the pump could alternately be connected with one of two mixing vessels. The pump also was connected to an electrical level regulator so that the same liquid level was maintained in the tube. The tube operated without external pressure in a protective gas atmosphere of nitrogen, hydrogen, argon, or another inert gas. The required monomer solutions were produced alternately in one of the mixing vessels, for instance as follows:

6.4 kg. sodium salt of 4,4′-disulfhydryldiphenylether, 4.65 kg. dichlorodiphenylsulfone and 10 kg. dimethylformamide were mixed in a 30 liter vessel at room temperature. The mixture was constantly agitated and introduced into the condensation tube at a speed of 0.8 l./h. The tube had an internal temperature of 130°. As soon as the tube was filled, the outlet tube was operated and the highly viscous polymer solution pressed through the nozzle at an hourly throughput of 0.8 liter. The rod thus extruded had a diameter of 3 mm., was immersed to cold water and thereby solidified. Thereafter, it was granulated. The granulate was freed of dimethylformamide and NaCl in a counter-current extractor and dried. With the aid of the two mixing vessels, used alternately, the condensation tube could be operated continuously.

The thioether thus produced within 24 hours had an intrinsic viscosity of 0.46±0.02, measured as a 0.2% solution in CHCl₃. The polymer could be cast into tough and heat-resistant films of high transparency from the chloroform solution.

In lieu of the alkali salts, alkaline earth salts could be used in all the above examples with equally good results. Also, instead of benzene, toluene or xylene could be used in the azeotropic distillation. Finally, as polar solvents, dimethylacetamide, hexamethylphosphoneamide, ethylene- and diethyleneglycoldimethylether, could be employed equally well as the solvents named. Also, all components named above under A (dithiols) and B (dihalogen compounds) are applicable.

I claim as my invention:

1. A process for the manufacture of heat-resistant, high-molecular, linear, thermoplastic polythioether resins having the structural formula

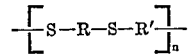

wherein R is a bivalent radical having the generic formula

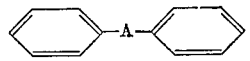

A being a bivalent bridging member selected from the group consisting of

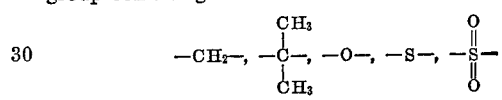

and wherein R′ is a bivalent aromatic radical having at least one electron-attracting group selected from the group consisting of nitro-, nitroso-, acetyl-, carboxy alkyl-, cyano, alkylsulfone-, phenylsulfone-, trifluoromethyl-, carbonyl-, sulfone- and phosphine oxide groups, in at least one position ortho or para to the radical sites; and wherein R and R′ are linked together by S atoms; which comprises poly-condensing a substance selected from the group consisting of alkali- and alkaline earth metal salts of an aromatic dithiol with an aromatic dihalogen compound activated by said electron-attracting group, in a strongly polar solvent untily polycondensation is complete, said polar solvent being dimethylformamide, dimethylacetamide, dimethylsulfoxide, hexamethylphosphoneamide, N-methylpyrrolidone, ethyleneglycol- and diethylene glycoldimethyl ether, and tetrahydrothiophene-1,1.

2. The process as defined in claim 1, wherein polycondensation is carried out in an inert gas atmosphere.

3. The process as defined in claim 1, wherein polycondensation is carried out at temperatures ranging substantially from 50 to 250° C. for substantially 2 to 8 hours at atmospheric pressure.

4. Heat-resistant, high-molecular, linear, thermoplastic polythioether resins which comprises repeated units having the structure

where R is a bivalent radical of the generic formula

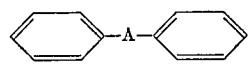

A being a bivalent bridging member selected from the group consisting of

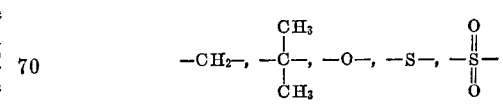

and wherein R′ is a bivalent aromatic radical having at least one electron-attracting group selected from the group consisting of nitro-, nitroso-, acetyl-, carboxy alkyl-, cyano-, alkylsulfone-, phenylsulfone-, trifluoromethyl-, carbonyl-, sulfone-, and phosphine oxide groups, in at least one of the position ortho or para to the radical sites.

References Cited

UNITED STATES PATENTS

| | | | |
|---|---|---|---|
| 2,198,828 | 4/1940 | Liber et al. | 260—79 |
| 2,201,884 | 5/1940 | Carothers | 260—79.1 |
| 2,822,351 | 2/1958 | Kreuchunas | 260—79 |
| 2,926,158 | 2/1960 | Martin | 260—79 |
| 3,133,899 | 5/1964 | Kwiatek et al. | 260—79 |
| 3,248,325 | 4/1966 | Graham | 260—79.1 |
| 3,268,504 | 8/1966 | Harris et al. | 260—79.1 |
| 3,324,087 | 6/1967 | Smith et al. | 260—79 |
| 3,326,865 | 6/1967 | Smith | 260—79 |
| 3,354,129 | 11/1967 | Edmonds et al. | 260—79 |

DONALD E. CZAJA, *Primary Examiner.*

M. J. MARQUIS, *Assistant Examiner.*

U.S. Cl. X.R.

260—30.8, 32.6, 33.2, 33.8, 48, 79, 19.1, 79.3

Notice of Adverse Decision in Interference

In Interference No. 97,704 involving Patent No. 3,432,468, R. Gabler, HEAT-RESISTANT POLYTHIOETHERS AND METHOD FOR THEIR PRODUCTION, final judgment adverse to the patentee was rendered Feb. 15, 1972, as to claim 4.

[*Official Gazette February 6, 1973.*]